2,862,919

DISAZO DYESTUFFS

Herbert-Joachim Exner, Koln-Stammheim, Germany, assignor to Farbenfabriken Bayer Aktiengesellschaft, Leverkusen, Germany, a corporation of Germany No Drawing. Application March 7, 1957
Serial No. 644,464

Claims priority, application Germany May 19, 1956

7 Claims. (Cl. 260—160)

The present invention relates to disazo dyestuffs and to a process for their manufacture; more particularly it relates to disazo dyestuffs of the following formula

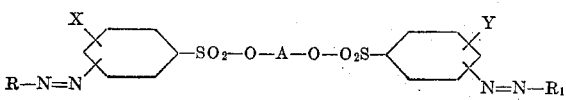

In this formula R means a radical of a 1-aryl-3-methyl-5-aminopyrazol coupled in 4-position, $R_1$ means a radical of a 1-aryl-3-methyl-5-aminopyrazol which is coupled in 4-position or a radical of an aminonaphthalene coupled in o-position to the amino group, X and Y stand for hydrogen or non-ionic substituents, and A stands for an aromatic radical which may contain non-ionic substituents.

In accordance with the present invention it has been found that valuable disazo dyestuffs of the above-mentioned formula are obtainable by coupling 1 mol of a tetrazotized diamine of the general formula:

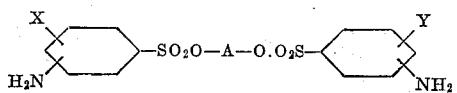

wherein A, X and Y have the meaning as previously defined, with 1 mol of a 1-aryl-3-methyl-5-aminopyrazole and with 1 mol of the same azo component or 1 mol of an aminonaphthalene.

The tetrazo components may be prepared by reaction of nitrobenzene-sulfochlorides of the general formula

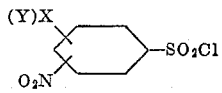

with aromatic dihydroxy compounds of the general formula

wherein A, X and Y have the above-mentioned significance, in an aqueous medium in the presence of acid-binding agents or in suitable organic solvents and subsequent reduction of the nitro group according to known processes. It is not absolutely essential that 1 mol of the aromatic dihydroxy compound is reacted with 2 mols of the same nitrobenzene-sulfochloride. It is also possible to react consecutively 1 mol of a nitrobenzene-sulfochloride and another mol of a different nitrobenzene-sulfochloride, or even 2 mols of a mixture of different nitrobenzene-sulfochlorides, with the dihydroxy-compound. The conversion of the dinitro compounds into the corresponding diamino compounds is effected by known processes.

Suitable tetrazo components according to the definition of the invention are, for example: 1,2-dihydroxybenzene-bis - (2 - aminophenyl - 1 - sulfonic acid) - ester, 1,2 - dihydroxybenzene - bis - (3 - aminophenyl - 1 - sulfonic acid) - ester, 1,2-dihydroxybenzene-bis-(4 - aminophenyl-1 - sulfonic acid) - ester, 4,4' - dihydroxydiphenyl - bis - (2 - aminophenyl - 1 - sulfonic acid) - ester, 4,4' - dihydroxydiphenyl - bis - (3 - aminophenyl - 1 - sulfonic acid) - ester, 4,4' - dihydroxydiphenyl - bis - (4 - aminophenyl - 1 - sulfonic acid) - ester, 1,5 - dihydroxynaphthalene - bis - (2 - aminophenyl - 1 - sulfonic acid) - ester, 1,5 - dihydroxynaphthalene - bis - (3 - aminophenyl - 1 - sulfonic acid) - ester, 1,5 - dihydroxynaphthalene - bis - (4 - aminophenyl - 1 - sulfonic acid) - ester, di - (p - hydroxyphenyl) - dimethylmethane - bis - (2 - aminophenyl - 1 - sulfonic acid) - ester, di - (p - hydroxyphenyl) - dimethylmethane - bis - (3 - aminophenyl - 1 - sulfonic acid) - ester, di - (p - hydroxyphenyl) - dimethylmethane - bis - (3 - amino - 6 - chlorophenyl - 1 - sulfonic acid) - ester, di - (p - hydroxyphenyl) - dimethylmethane - bis - (4 - aminophenyl - 1 - sulfonic acid) - ester, 1,3 - dihydroxybenzene - bis - (3 - amino - 4 - chlorophenyl - 1 - sulfonic acid) - ester, 1,3 - dihydroxybenzene - bis - (2 - amino - 4 - chlorophenyl - 1 - sulfonic acid) - ester.

Further diamines may be obtained, for example, by reduction of the reaction products from 1 mol of di-(p-hydroxyphenyl)-dimethylmethane and 1 mol of 2-nitrobenzene-sulfochloride and 1 mol of 3-nitrobenzene-sulfochloride. Instead of 1 mol of di-(p-hydroxyphenyl)-dimethylmethane there may also be used di-(p-hydroxyphenyl)-methylmethane, di-(p-hydroxyphenyl)-methane, 4,4'-dihydroxy-diphenylsulfone or 1,3-dihydroxybenzene.

According to the definition there is employed as coupling agent at least 1 mol of a 1-aryl-3-methyl-5-aminopyrazole per mol of the tetrazo compound. The aryl radical may contain non-ionic or ionic substitutents, such as sulfonic acid or carboxylic acid groups. The following compounds may be mentioned as examples: 1 - phenyl - 3 - methyl - 5 - aminopyrazole, 1 - (2' - sulfophenyl) - 3 - methyl - 5 - aminopyrazole, 1 - (3' - sulfophenyl) - 3 - methyl - 5 - aminopyrazole, 1 - (4' - sulfophenyl) - 3 - methyl - 5 - aminopyrazole, 1 - (3' - carboxyphenyl) - 3 - methyl - 5 - aminopyrazole, 1 - (2' - chloro - 5' - sulfophenyl) - 3 - methyl - 5 - aminopyrazole, 1 - (2',5' - dichloro - 4' - sulfophenyl) - 3 - methyl - 5 - aminopyrazole, 1 - (6' - sulfonaphthyl - 2') - 3 - methyl - 5 - aminopyrazole, 1 - (8' - sulfonaphthyl - 2') - 3 - methyl - 5 - aminopyrazole, 1 - (4', 8' - disulfonaphthyl - 2') - 3 -methyl - 5 - aminopyrazole.

For the further coupling, the following compounds may be used:

1 - aminonaphthalene, 1 - amino - 8 - chloronaphthalene, 1 - amino - naphthalene - 2-,3-,4-,5-,6-,7- or 8- sulfonic acid, 1 - aminonaphthalene - 2,5 - disulfonic acid, 1 - aminonaphthalene - 3,6 - disulfonic acid, 1 - aminonaphthalene - 3,7 - disulfonic acid, 1 - aminonaphthalene - 3,8 - disulfonic acid, 1 - aminonaphthalene - 4,6 - disulfonic acid, 1 - aminonaphthalene - 4,7 - disulfonic acid, 1 - aminonaphthalene - 4,8 - disulfonic acid, 1 - aminonaphthalene - 5,7 - disulfonic acid, 1 - aminonaphthalene - 2,5,7 - trisulfonic acid, 1 - aminonaphthalene - 3,5,7 - trisulfonic acid, 1 - aminonaphthalene - 3,6,8 - trisulfonic acid, 1 - aminonaphthalene - 4,6,8 - trisulfonic acid, 2 - aminonaphthalene 2 - aminonaphthalene - 5-,6-,7- or 8- sulfonic acid, 2 - aminonaphthalene - 3,6 - disulfonic acid, 2 - aminonaphthalene - 3,7 - disulfonic acid, 2 - aminonaphthalene - 4,7 - disulfonic acid, 2 - aminonaphthalene - 4,8 - disulfonic acid, 2 - aminonaphthalene - 5,7 - disulfonic acid, 2 - aminonaphthalene - 3,6,8 - trisulfonic acid, 2 - aminonaphthalene - 4,6,8 - trisulfonic acid, 2 - amino - 8 - hydroxynaphthalene, 2 - amino - 8 - hydroxynaphthalene - 6 - sulfonic acid, or 2 - amino - 8 - hydroxynaphthalene - 3,6 - disulfonic acid.

By using 2 mols of the same or different coupling components per mol of tetrazo compound, it is possible to prepare symmetrical or asymmetrical disazo dyestuffs.

The new disazo dyestuffs dye animal fibres such as wool and silk and synthetic fibres such as polyamide and polyurethane fibres in clear shades from a weakly acid or neutral bath. The dyeing possesses very good fastness properties to light and wetting, and the dyestuffs are distinguished by a good levelling power.

The following examples are given for the purpose of illustrating the invention, without, however, limiting it thereto:

*Example 1*

56.0 grams of 4,4'-dihydroxy-diphenylsulfone-bis-(2-amino-phenyl-sulfonic acid)-ester are tetrazotized with 13.8 grams of sodium nitrite. To the tetrazo solution there are added 50.4 grams of 1-(3-sulfophenyl)-3-methyl-5-aminopyrazole, the solution is neutralized with sodium acetate and coupling completed while cooling. The isolated dyestuff corresponds in the free acid state to the formula:

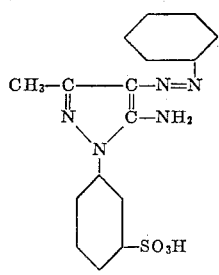

It dyes wool in yellow shades of very good fastness to light and wetting.

*Example 2*

42.0 grams of 1,2-dihydroxybenzene-bis-(2-aminophenyl-1-sulfonic acid)-ester are tetrazotized with 13.8 grams of sodium nitrite, the tetrazo solution is treated with 61 grams of 1-(8'-sulfonaphthyl-2')-3-methyl-5-aminopyrazole and coupled with addition of sodium acetate.

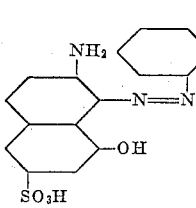

The isolated dyestuff corresponds in the free acid state to the formula:

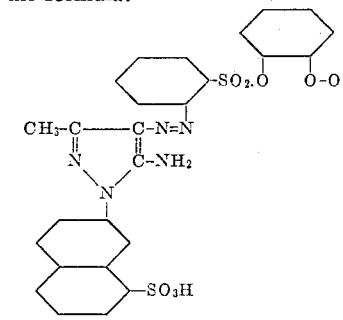

It dyes wool in yellow shades fast to light and wetting.

*Example 3*

42.0 grams of 1,3-dihydroxybenzene-bis-(2-aminophenyl-1-sulfonic acid)-ester are tetrazotized with 13.8 grams of sodium nitrite, and the solution is treated with 61 grams of 1-(6'-sulfonaphthyl-2)-3-methyl-5-aminopyrazole. After neutralizing the solution, coupling is completed. The isolated dyestuff which corresponds in the free acid state to the formula:

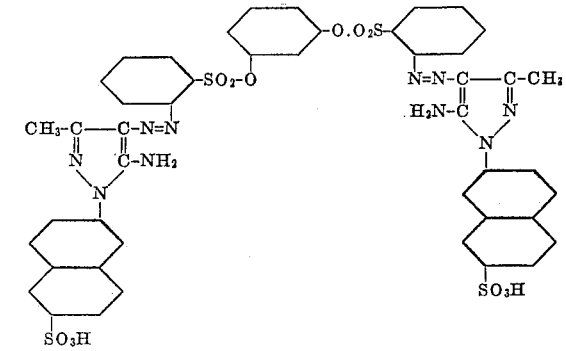

dyes wool in yellow shades of very good fastness to light and wetting.

*Example 4*

54.0 grams of di-(p-hydroxyphenyl)-dimethylmethane-bis-(2-aminophenyl-1-sulfonic acid)-ester are tetrazotized with 13.8 grams of sodium nitrite. A freshly precipitated suspension of 23.9 grams of 2-amino-8-hydroxynaphthalene-6-sulfonic acid is slowly run into the tetrazo solution and stirring is continued with cooling until the tetrazo reaction has ceased. 25.2 grams of 1-(3'-sulfophenyl)-3-methyl-5-aminopyrazole are then added and the final coupling is completed by heating. The dyestuff corresponds in the free acid state to the formula:

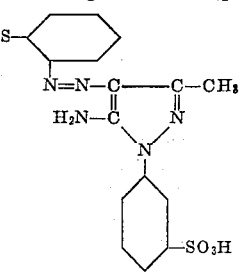

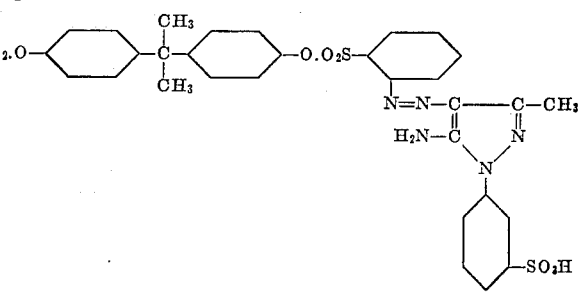

and dyes wool in yellowish red shades of very good fastness to light and wetting.

*Example 5*

49.6 grams of 2,2'-dihydroxy diphenyl-bis-(2-aminophenyl-1-sulfonic acid)-ester are tetrazotized with 13.8 grams of sodium nitrite. A suspension of 22.3 grams of Dahl acid (a commercial mixture of 2-aminonaphthalene-5-sulfonic acid and 2-aminonaphthalene-8-sulfonic acid) is slowly run into the tetrazo solution and cooling is continued until the tetrazo reaction disappears. 30.5 grams of 1-(8'-sulfonaphthyl-2')-3-methyl-5-aminopyrazole are added and coupling is completed with heating after neutralizing the mixture. The isolated dyestuff dyes wool in yellow shades of very good fastness to light and wetting.

*Example 6*

54.0 grams of di-(p-hydroxyphenyl)-dimethyl-methane-bis-(3-aminophenyl-1-sulfonic acid)-ester are tetrazotized with 13.8 grams of sodium nitrite, and 50.4 grams of 1-(3'-sulfophenyl)-3-methyl-5-aminopyrazole are added. After neutralizing the mixture coupling is completed. The isolated dyestuff corresponds in the free acid state to the formula

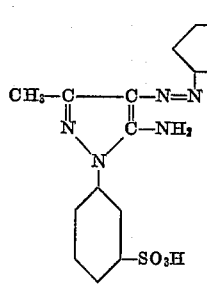

It dyes wool in yellow shades of very good fastness to light and wetting.

Example 7

42.0 grams of 1,2-dihydroxybenzene-bis-(3-aminophenyl-1-sulfonic acid)-ester are tetrazotized with 13.8 grams of sodium nitrite. A suspension of 23.9 grams of 2-amino-8-hydroxynaphthalene-6-sulfonic acid is slowly run into the tetrazo solution, and coupling is carried out until the tetrazo reaction disappears. 30.5 grams of 1-(6'-sulfonaphthyl-2')-3-methyl-5-aminopyrazole are then added and coupling is completed by heating. The isolated dyestuff which corresponds in the free acid state to the formula:

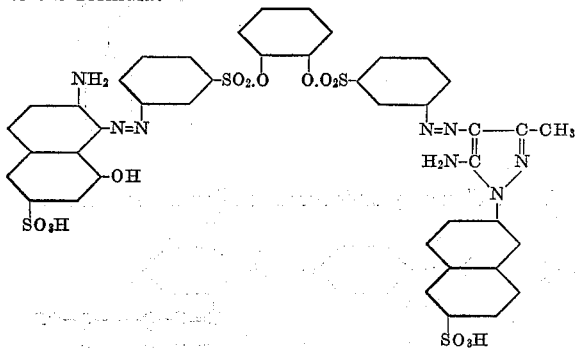

dyes wool in yellowish red shades of good fastness to light and wetting.

Example 8

54.0 grams of di-(p-hydroxyphenyl)-dimethyl-methane-bis-(4-aminophenyl-1-sulfonic acid)-ester are tetrazotized with 13.8 grams of sodium nitrite, and the tetrazo solution is treated with 50.4 grams of 1-(3'-sulfophenyl)-3-methyl-5-aminopyrazole. The pH value of the solution is slowly increased, and coupling is completed with heating. The isolated dyestuff corresponding in the free acid state to the formula:

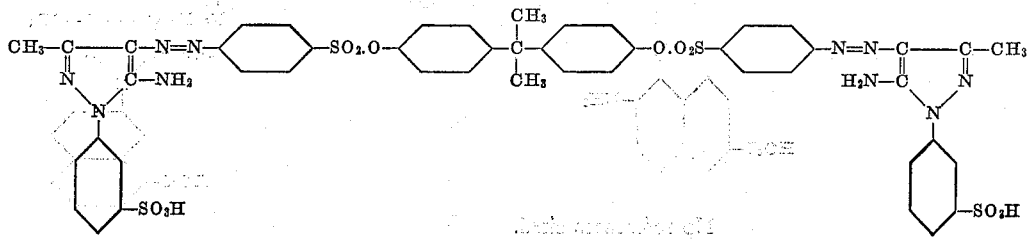

dyes wool in yellow shades of very good fastness to light and wetting.

Example 9

54.0 grams of the product which is obtained by reduction of a compound obtained by reaction of 22.8 grams of di-(p-hydroxyphenyl)-dimethylmethane with 22.1 grams of 2-nitrobenzene-sulfochloride and 22.1 grams of 3-nitrobenzene-sulfochloride are tetrazotized with 13.8 grams of sodium nitrite and the clear tetrazo solution is treated with 50.4 grams of 1-(3'-sulfophenyl)-3-methyl-5-aminopyrazole. Coupling is completed by the addition of acid-binding agents. The isolated dyestuff corresponds in the free acid state to the formula

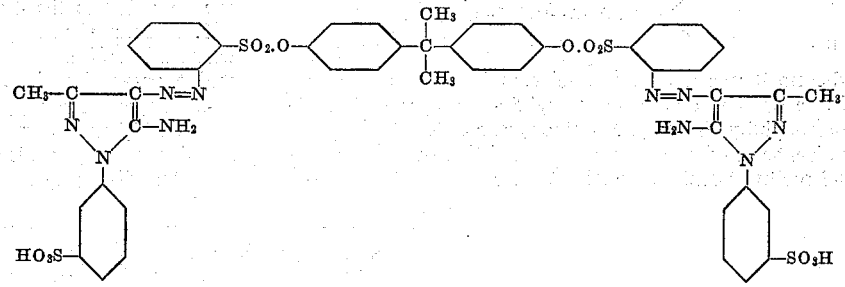

It dyes wool in yellow shades of very good fastness to light and wetting.

Example 10

2 grams of the dyestuff described in Example 1 are dissolved in 3 litres of water. After the addition of 10 grams of crystallized sodium sulfate and 2 millilitres of 30 percent acetic acid, 10 grams of a woolen fabric are introduced in the dye bath, the bath heated to boiling temperature within 40 minutes and boiled for 30 minutes. After the addition of 2 millilitres of formic acid the bath is heated for a further 30 minutes and the dyed fabric is rinsed with water and dried. A yellow shade is thus obtained.

Example 11

54.0 grams of di-(p-hydroxyphenyl)-dimethylmethane-bis-(2-aminophenyl-1-sulfonic acid)-ester are tetrazotized with 13.8 grams of sodium nitrite. A freshly precipitated suspension of 30.5 grams of 1-(8'-sulfonaphthyl-2')-3-methyl-5-aminopyrazol is added, the mixture diluted with water and neutralized with sodium acetate. 22.4 grams of 2-amino-naphthalene-6-sulfonic acid are then added and the final coupling is completed by heating. The isolated dyestuff which corresponds in the free acid state to the formula:

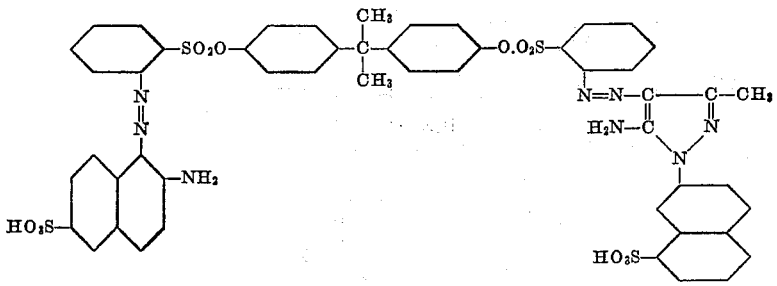

dyes wool in reddish-yellow shades of very good fastness to light and wetting.

I claim:
1. A disazo dyestuff corresponding to the general formula

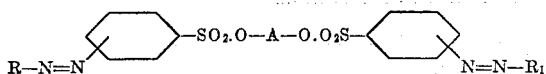

wherein R means a radical selected from the group consisting of 1-sulfophenyl-3-methyl-5-aminopyrazole and 1-sulfonaphthyl-3-methyl-5-aminopyrazole, $R_1$ stands for a radical selected from the group consisting of 1-sulfophenyl-3-methyl-5-aminopyrazole, 1-sulfonaphthyl-3-methyl-5-aminopyrazole, 2-aminonaphthalene-sulfonic acid and 2-aminonaphthol-sulfonic acid, the pyrazolyl radicals being coupled in the 4-position and the naphthyl radicals being coupled in o-position to the amino group, and A stands for a divalent radical selected from the group consisting of members of the phenylene, diphenylene, diphenylenesulfone, and the dimethyl-diphenylene-methane series.

2. A disazo dyestuff corresponding to the formula

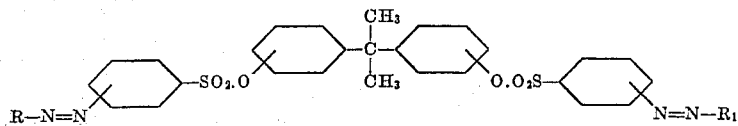

wherein R is 1-sulfophenyl-3-methyl-5-aminopyrazolyl and $R_1$ is 1-sulfonaphthyl-3-methyl-5-aminopyrazolyl, each coupled in the 4-position.

3. A dyestuff corresponding to the formula of claim 2, wherein R and $R_1$ are each the 1-sulfophenyl-3-methyl-5-aminopyrazolyl radical.

4. A dyestuff corresponding to the formula of claim 2, wherein $R_1$ and $R_2$ are each the 1-sulfonaphthol-3-methyl-5-aminopyrazolyl radical.

5. The disazo dyestuff corresponding to the formula

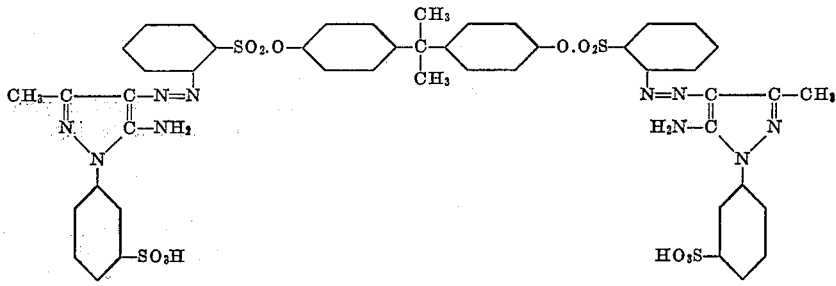

6. The disazo dyestuff corresponding to the formula

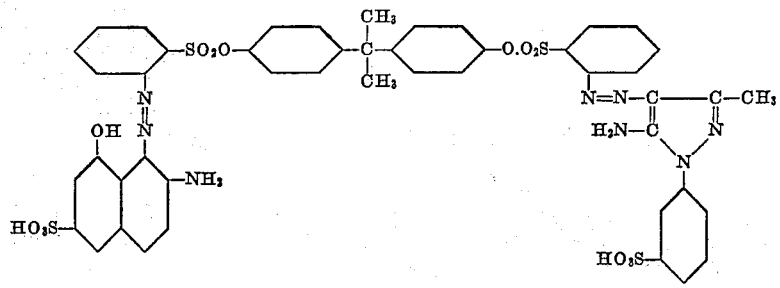

7. The disazo dyestuff corresponding to the formula

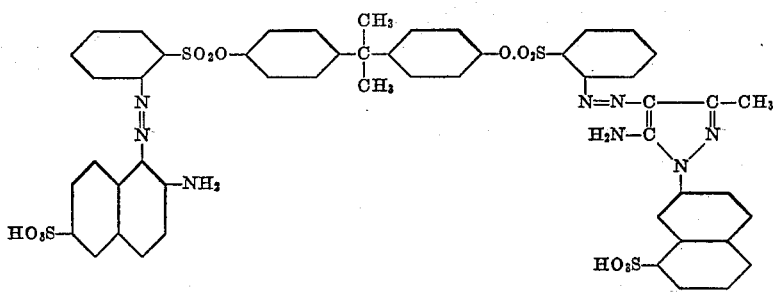

No references cited.